United States Patent
Rochkind (10) Patent No.: US 6,356,928 B1
(45) Date of Patent: Mar. 12, 2002

(54) METHOD FOR PARTITIONING TASKS INTO STATELESS ELEMENTS

(75) Inventor: Mark Meier Rochkind, Morristown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/948,116

(22) Filed: Oct. 9, 1997

(51) Int. Cl.⁷ ................................. G06F 9/00
(52) U.S. Cl. ..................... 709/101; 709/100; 705/34
(58) Field of Search ................... 395/614; 705/1, 705/8, 7, 9, 34, 43, 2; 709/300, 311–332, 101, 100, 102, 104, 105, 106; 707/1, 100, 103

(56) References Cited

U.S. PATENT DOCUMENTS

| | | | | |
|---|---|---|---|---|
| 4,896,269 A | * | 1/1990 | Tong | 364/468.07 |
| 4,937,760 A | | 6/1990 | Beitel et al. | 364/153 |
| 5,241,652 A | | 8/1993 | Barabash et al. | 395/64 |
| 5,301,320 A | * | 4/1994 | McAtee et al. | 705/9 |
| 5,437,032 A | * | 7/1995 | Wolf et al. | 709/103 |
| 5,535,322 A | * | 7/1996 | Hecht | 705/1 |
| 5,551,027 A | | 8/1996 | Choy et al. | 395/600 |
| 5,615,127 A | | 3/1997 | Beatty et al. | 364/489 |
| 5,621,809 A | | 4/1997 | Bellegarda et al. | 382/116 |
| 5,668,993 A | * | 9/1997 | Peters et al. | 709/101 |
| 5,721,913 A | * | 2/1998 | Ackroff et al. | 395/614 |
| 5,836,011 A | * | 11/1998 | Hambrick et al. | 705/8 |
| 5,848,271 A | * | 12/1998 | Caruso et al. | 709/300 |
| 5,940,813 A | * | 8/1999 | Hutchings | 705/43 |
| 5,999,916 A | * | 12/1999 | Peters et al. | 705/34 |

* cited by examiner

Primary Examiner—Majid A. Banankhah (57) ABSTRACT

A method and apparatus for partitioning each job within a plurality of jobs into stateless tasks. Each job is marked with at least one task divider defining two tasks. Each task divider indicates where, in the job flow, required data is unavailable. For each task divider, state information is preserved, a task is created which tests for availability of the required data, and predefined actions are taken. An initial task is entered into an alert table or an execution queue. When that task executes, it queues subsequent tasks for immediate or delayed execution.

13 Claims, 4 Drawing Sheets

| TASK 300 | TASK 330 | |
|---|---|---|

EXECUTION QUEUE 400
401, 402

FIG. 4B

| CLOCK INTERVALS | ASSOCIATED, TASK IDs |
|---|---|
| 10 DAYS | TASK 340 |
| 10 DAYS | TASK 350 |
| 30 DAYS | TASK 310 |
| ⋮ | ⋮ |
| 270 DAYS | TASK 320 |

410
411, 412
413, 414, 415, 416

US 6,356,928 B1

METHOD FOR PARTITIONING TASKS INTO STATELESS ELEMENTS

FIELD OF THE INVENTION

The present invention relates to the processing of information requiring human attention to or interaction with an operations support system, such as the customer care associated with an electronic billing system. More specifically, the present invention relates to partitioning jobs requiring human attention or interaction into stateless tasks.

BACKGROUND

Known computer-based operations support systems, such as the customer care systems associated with an electronic billing system, frequently generate jobs which require human attention or interaction to resolve. These operations support systems will generate a list of such jobs which are then distributed to human agents for action.

Often, these jobs cannot be completed by a single human operator in a single attempt within a predictable time. Several reasons can exist to prevent a human operator from completing a job in a single attempt. For example, required data may be unavailable for a substantial period of time thereby necessitating the human operator to wait for the required data and then to continue processing the job at that later point in time.

Known computer-based operations support systems and especially those which serve customer care applications suffer from several shortcomings. Because a human operator must suspend processing of a job until certain required data becomes available, either the original human operator must resume processing of that job or else another human operator must obtain the preliminary data and results from the original human operator before resuming processing of that job. Of course, when the original human operator must resume processing of the job, an unnecessary and costly delay in completing the processing of the job potentially is introduced. For example, the human operator may be too busy processing other jobs to obtain and process the newly available data. The human operator may even forget to obtain and process the newly available required data, potentially for a substantial period of time. Consequently, efficiency, predictable performance, and minimized cost are hard to achieve.

Alternatively, for a subsequent human operator to process the job originally processed by another human operation, the subsequent human operator must obtain preliminary data and results from the original human operator. Transferring the preliminary data and results to the subsequent human operator unnecessarily delays processing of the job, creates opportunity for error, and wastes the time of both human operators.

SUMMARY OF THE INVENTION

The present invention partitions jobs or "information technology" work items into a queue of stateless tasks each of which can be completed by the same or a different human operator in a planned and predictable time. Any human operator can handle any task because each task is stateless, i.e., complete unto itself.

The present invention can optimally define the stateless tasks to be reusable when possible so that execution of tasks can be performed in an economically efficient manner. The present invention can recursively examine each job step associated with a task to identify standard job steps that are repeated and can be reused. Such reusable elements can then be implemented with special efficiency.

The present invention can be applied to jobs Which require data not immediately available to the agent presented with the job. Each job is partitioned into stateless tasks by marking each job with at least one task divider. Each task divider indicates a place where required data is unavailable or where a check should be made to determine whether the required data has become available. At each place in the job where a task divider is placed, state information is preserved, a task which tests for availability of the required data is created, and the task is entered into an execution queue or an alert table. The execution queue can be a queue of a processor where jobs are buffered for immediate execution; each job is executed when a processor is available to process the job. The alert table can be a deterministic delayed queue where jobs are buffered for a specified period of time; when the specified delay period of time for a corresponding job has expired, the job is moved to the execution queue for immediate execution.

The alert table can include an identification of each task entered into the alert table and a time interval indicating when each task in the alert table is to enter the execution queue.

The jobs can be, for example, the class of customer care activities associated with responses to rejected transactions returned by a payments system which is engaged to process deferred charge transactions against credit or debit accounts. The human operator can be a customer care agent.

DETAILED DESCRIPTION

Note that throughout the specification, reference will be made to a particular communications network and to an exemplary operations support system performing electronic billing where the jobs are customer care activities associated with responses to rejected transactions returned by a payments system platform engaged to process deferred charge transactions against credit or debit accounts. The present invention, however, can also be applied to other types of operations support systems requiring human interaction during the processing of jobs.

Figure 1A:
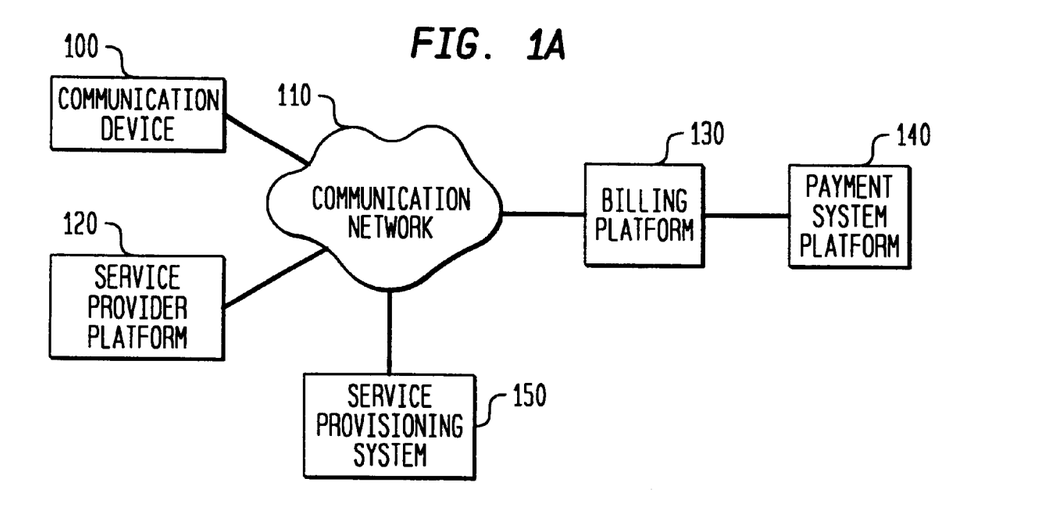
FIG. 1A illustrates elements of an operations support system, a service provider platform and a communications device within a communications network, according to an embodiment of the present invention.

FIG. 1A illustrates elements of an operations support system, a service provider platform and a communication device within a communications network, according to an embodiment of the present invention. Communication device 100 is connected to communications network 110. Service provider platform 120 is connected to communications network 110. Billing platform 130 is connected to communications network 110 and to payment system platform 140. Service provisioning system 150 is connected to communications network 110. Alternatively, payment system platform 140 can be connected communication network 110.

Communication device 100 can be any of a variety of types such as a telephone, facsimile machine or a personal computer. Communication device 100 transmits and receives information through communication network 110. The term "information" as used herein is intended to include data, text, voice, audio, video and/or multimedia.

Communications network 110 can be of any type including, for example, the public switched telephone network (PSTN), international networks, the Internet, an intranet or any combination of networks. For example, communications network 110 can include the AT&T interexchange (IXC) network and/or central offices of local exchange carriers (LECs).

Service provider platform 120 can be any type of platform supporting a service provider. For example, service provider platform 120 can provide a customer at communications device 100 a usage-based service, such as a Internet-related service, or a product or service billed independent of usage, such as a product sold through a mail-order catalog.

Figure 1B:
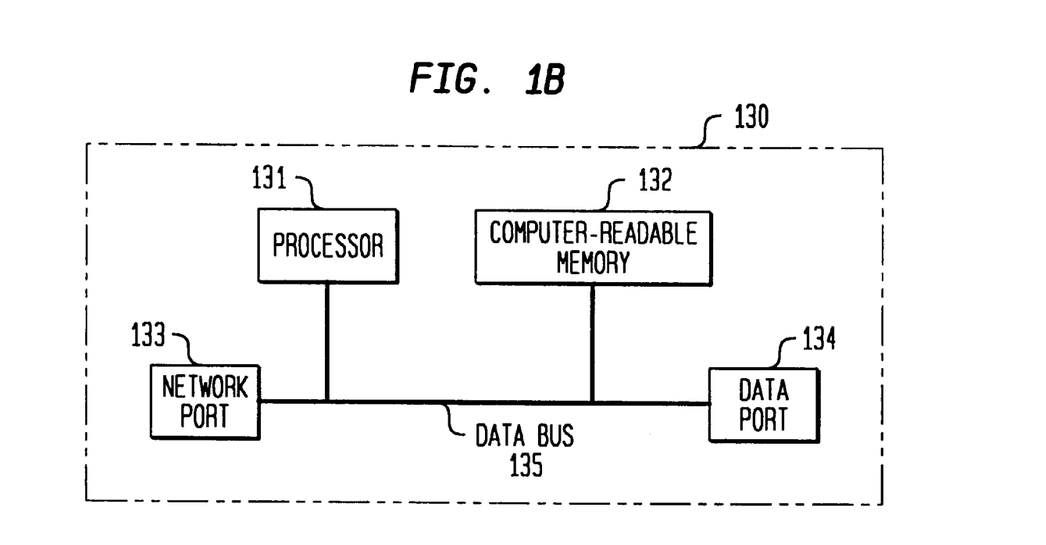
FIG. 1B illustrates a configuration of a billing platform, according to an embodiment of the present invention.

Billing platform 130 is any type of adjunct platform comprising the hardware and software appropriate to operate the necessary billing functions. FIG. 1B illustrates a configuration of a billing platform, according to an embodiment of the present invention.

Billing platform 130 can comprise processor 131, computer-readable memory 132, network port 133, data port 134 and data bus 135. Network port 133 can be connected to communication network 110. Data port 134 can be connected to payment system platform 140 (shown in FIG. 1A). Data bus 135 connects processor 131, computer-readable memory 132, data port 134 and network port 133. Computer-readable memory 132 can store a customer database containing customer names, addresses, security words, credit card numbers, expiration dates, and merchant bank identifications. Processor 131 or computer-readable memory 132 can include an execution queue which can buffer tasks awaiting processing.

Payment system platform 140 (FIG. 1) is any type of adjunct platform comprising the hardware and software appropriate to perform the necessary payment transaction functions. Payment system platform 140 can include a merchant bank processor.

Service provisioning system 150 is any type of adjunct platform comprising the hardware and software appropriate for customer registration and service delivery. Service provisioning system 150 can collect the appropriate customer information for registration and service delivery, and then forward that information to service provider platform 120.

Although FIG. 1A only shows communication device 100, service provider platform 120 and service provisioning system 150 connected to communication network 110, any number of additional communication devices, service provider platforms and/or service provisioning systems may be connected to communication network 110.

Billing system 130 can perform electronic billing for services ordered by communication devices or their surrogates, or delivered by service platforms through communication network 110. Billing system 130 also can perform electronic billing for usage of communication network 110. Billing system 130 maintains a database of validated customer accounts and collects transaction data identified by customer and service. Billing system 130 then rates the transactions, makes an entry per transaction in the customer account database, accumulates a balance for each customer account, discounts and taxes the balance, and then conveys the summary bill to the payment system platform 140. One embodiment of this process is described in more detail below.

A customer located at communications device 100 registers for credit card billing with a service provider via service provisioning system 150; the registration information can then be forwarded to service provider platform 120. The service provider from service provider platform 120 opens a customer credit card account at billing platform 130. Billing platform 130 performs credit and address verification through payment system platform 140. Billing platform 130 affirms credit worthiness of the customer with service provider platform 120 so that the service provider can provide service with the expectation that it will be paid.

The customer buys a product, usage-based service or recurring service from the service provider through service provider platform 120. Service provider platform 120 sends a transaction detail record to billing platform 130. The transaction detail record includes a record of the purchase by the customer. That transaction detail record is written to the customer database of billing platform 130. The transaction detail record may or may not be rated before being written to customer database.

At the close of the billing cycle, billing platform 130 rates, accumulates, discounts, taxes, and sends a charge transaction to the merchant bank processor at payment system platform 140 when the accumulated balance exceeds some threshold. The merchant bank processor at payment system platform 140 processes the transaction and then settles with the service provider at service provider platform 120 by transferring revenue to the service provider's bank account. The merchant bank processor also settles with billing platform 130 by providing audit data and fees charged.

Billing platform 130 delivers electronic feeds for revenue and tax journalization to service provider platform 120. At the end of the billing cycle, the issuing bank that issued the credit card sends a credit card statement to the customer. The credit card statement can be sent to the customer through regular mail or electronically through communication network 110 to communication device 100.

Billing system 130 also allows customer care activities to be performed. The customer care activities can be associated with rejected charge transactions returned by payments system platform 140. For example, payments system platform 140 can provide a rejected transaction to billing platform 130 when the credit card, corresponding to the credit card being processed, was reported lost, stolen, or otherwise invalid or when the associated account has insufficient funds. To perform such customer care activities in an accurate and efficient manner, the customer care activities (also referred to herein as "jobs") can be partitioned into stateless tasks.

The tasks are stateless in the sense that each task is independent of all other tasks, except for being sequentially ordered, and each task can be executed to completion without waiting for data to become available (excluding the real time required to retrieve the data from the computer-readable memory associated with billing platform 130). In other words, each task is stateless in that it is complete unto itself. Each stateless task, however, has state information that typically must be retrieved at the beginning of execution and that typically must be stored at the completion of execution for later retrieval by a subsequent task. Consequently, any human agent can execute any task without any prior knowledge of how or when other tasks for a given job were executed. In other words, a different human agent can execute each task without any contact or cooperation between the human agents. Because some tasks can be executed in an autonomous manner (e.g. by a computer processor) without a human agent, these tasks also can be executed without any contact or cooperation between the previous processing agent (human or otherwise).

Figure 2:
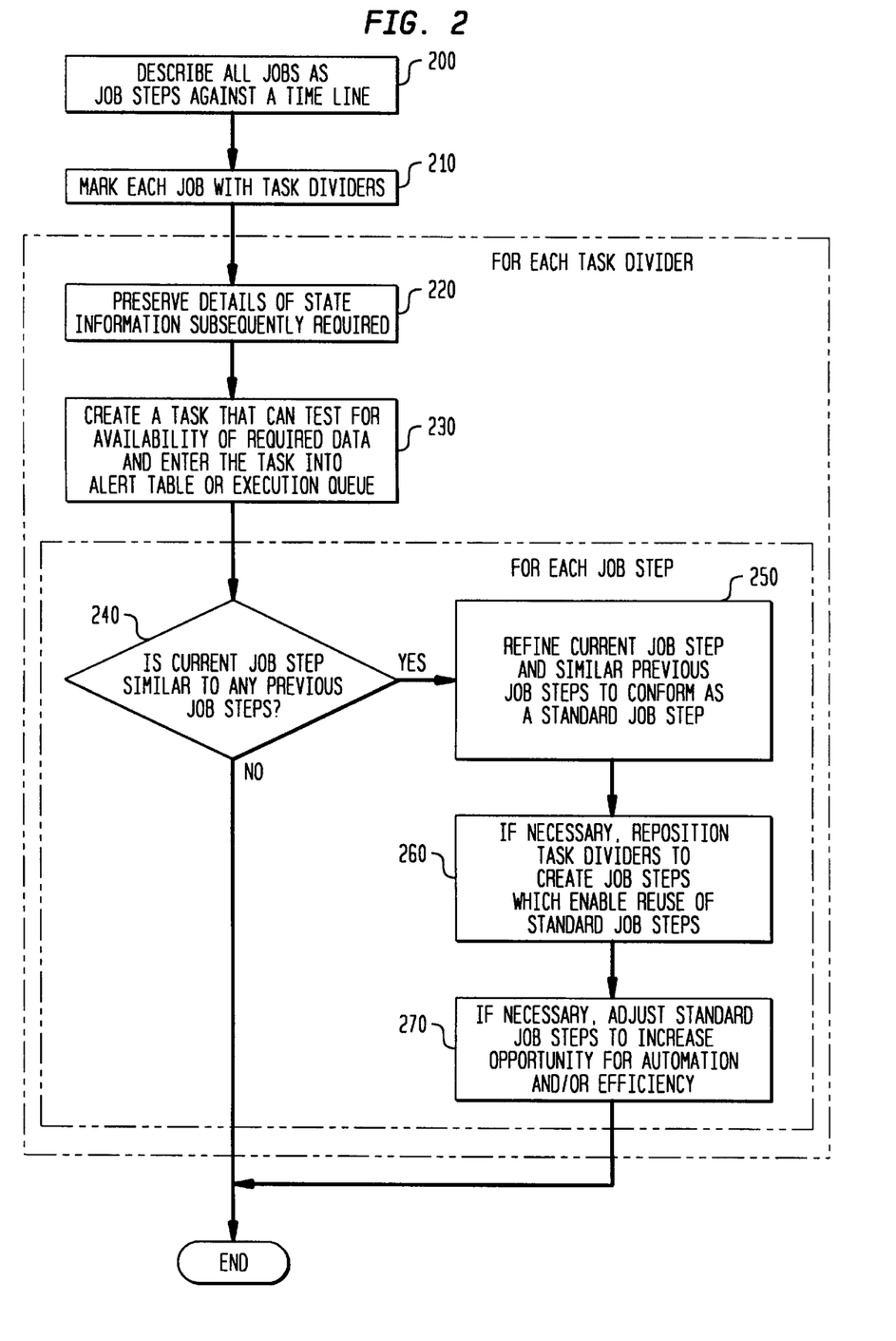
FIG. 2 provides a flow chart illustrating a process for partitioning jobs into stateless tasks, according to an embodiment of the present invention.

FIG. 2 provides a flow chart illustrating a process for partitioning jobs into stateless tasks, according to an embodiment of the present invention. Although FIG. 2 is described in reference to the customer care activities in an electronic billing system, the process described in FIG. 2 is equally applicable to other types of operation support systems requiring human interactions.

At step 200, billing platform 130 describes all jobs as job steps against a time line. Tables 1 and 2 each illustrate an example of a job described as job steps against a time line resulting from step 200. Note that the jobs discussed in Tables 1 and 2 are illustrative examples. The process described in FIG. 2 can be applied to different jobs. Additionally, the particular job steps and time lines are illustrative examples corresponding to the exemplary jobs described in Tables 1 and 2. The jobs described in Tables 1 and 2 can be described by different job steps against a different time line than those shown in Tables 1 and 2.

Table 1 illustrates the job steps described for a job resolving a billing cycle charge transaction code indicating that the credit card number was not honored by a merchant bank processor located at payment system platform 140.

TABLE 1

| Job Step # | Time Line | Job Step |
|---|---|---|
| 1 | 0 | deactivate account and stop sources of all recurring charges |
| 2 | 0 | send message "credit card invalid (unable to process payment) - account deactivated" |
| 3 | 0 | send message "call to furnish valid credit card number and request reactivation" |
| 4 | 30 days | check if valid credit card number received; if valid credit card number not received, requeue this task; if valid credit card number received, resubmit outstanding balance |
| 5 | 270 days | if account has been deactivated for 270 days, close account |

Table 2 illustrates the job steps described for a job resolving a billing cycle charge transaction code indicating that the credit card number was reported lost.

TABLE 2

| Job Step # | Time Line | Job Step |
|---|---|---|
| 1 | 0 | send message "report of lost card - call within 10 days to supply new credit card number" |
| 2 | 10 days | check if new credit card number supplied |
| 3 | 10 days | if new credit card number supplied, resubmit transaction and end job |
| 4 | 10 days | if new credit card number not supplied, send message "report of lost card - call within 10 days to supply new credit card number" |

TABLE 2-continued

| Job Step # | Time Line | Job Step |
|---|---|---|
| 5 | 20 days | check if new credit card number supplied |
| 6 | 20 days | if new credit card number supplied, resubmit transaction and end job |
| 7 | 20 days | if new credit card number not supplied and account indicates that previous transaction was returned with "lost card" indication, perform job described in Table 1 - credit card not honored by merchant bank processor |
| 8 | 20 days | if new credit card number not supplied and this is the first transaction indicating lost credit card, leave balance outstanding for next billing cycle and note in customer account that transaction was returned with "lost card" indication |

At step 210, billing platform 130 marks each job with task dividers indicating where required data is unavailable. Data is unavailable if the waiting required to obtain the data is more than the time needed to retrieve the data from computer-readable memory associated with billing platform 130. For example, in the example shown in Table 2, job steps 2 through 4 require new data requested of a customer in job step 1. Because this data is not readily available and may become available in the next ten days, the data is considered unavailable and a task divider should be placed at the end of job step 1.

The task dividers indicate where the required data is unavailable and where the job steps can be separated to form tasks. In other words, the job steps preceding a task divider and the job steps following that task divider are separate grouped tasks. The job steps preceding the task divider are grouped into at least one task; the job steps following the task divider are grouped into at least one task.

At step 210, as applied to the example of the job associated with the transactional code indicating the credit card was not honored, as illustrated in Table 1, one divider can be defined after job step 3 and another divider can be defined after job step 4. Consequently, the first task includes the job steps 1, 2 and 3; the second task includes job step 4; the third task includes job step 5.

At step 210, as applied to the example of the job associated with the transactional code indicating lost credit card, as illustrated in Table 2, one divider can be defined after job step 1 and another divider can be defined after job step 4. Consequently, the first task includes job step 1; the second task includes job steps 2, 3 and 4; the third task includes job steps 5, 6, 7 and 8.

Steps 220 through 270 represent a recursive process performed separately for each job step. The purpose of this recursive process is to refine job step definitions so as to produce a minimal number of distinct steps and at the same time to create distinct steps which can be efficiently executed and reused.

At step 220, the details of state information required by any subsequent processing are preserved by billing platform 130. In other words, the state information that exists when processing ends at a task divider and will be needed in subsequent processing is stored. The state information can be stored, for example, in the customer account record on the billing platform 130 or in an adjunct storage database (not shown).

The preserved state information can include any state information necessary for subsequent processing. Using the example shown in Table 1 for illustrative purposes, the state data specific for the job steps before the first task divider will include the account status as having received the transactional response code indicating the credit card was not honored as well as the balance associated with the charge transaction which was not honored. Similarly, the state data specific for the job steps between the first and second task dividers will include the account status as being deactivated after receiving the transactional response code indicating lost credit card as well as the date of deactivation.

At step 230, a task is created which can test for the availability of the required data. A task is defined as the job step(s) between adjacent task dividers. In other words, for a given job, the first task will comprise the job steps before the first task divider, the second task will comprise the job steps between the first task divider and the second task divider, etc. Boolean operations can be included within tasks so that each task can trigger the appropriate subsequent task.

A task can test for the availability of the required data when needed. When the created task is the first task for a job, usually no need exists to test whether new data has become available; processing of the first task is performed with data initially available. The first task is entered into the execution queue of the processor of billing platform 130 for immediate execution. The remaining tasks, i.e., tasks other than the first task of a job, need to test for the availability of required data. By definition, these tasks were created because the required data was unavailable when the previous task was being processed. The tasks other than the first task check the computer-readable memory of billing platform 130 to determine whether the required data has been provided and been stored at billing platform 130.

Tasks other than the first task of a job are entered into an alert table which allows a specified clock interval to elapse before the tasks are activated for execution. The alert table can be stored on the computer-readable memory of billing platform 130. The first task of a job can be performed immediately and therefore can be entered into an execution queue for immediate execution rather than the alert table. Any one task can queue up one or more other tasks when the one task is completed. Thus, based on conditions at the conclusion of any task, appropriate subsequent tasks can be queued. Alternatively, upon the completion of a task, it can be appropriate for no task to be queued.

Figure 3A:
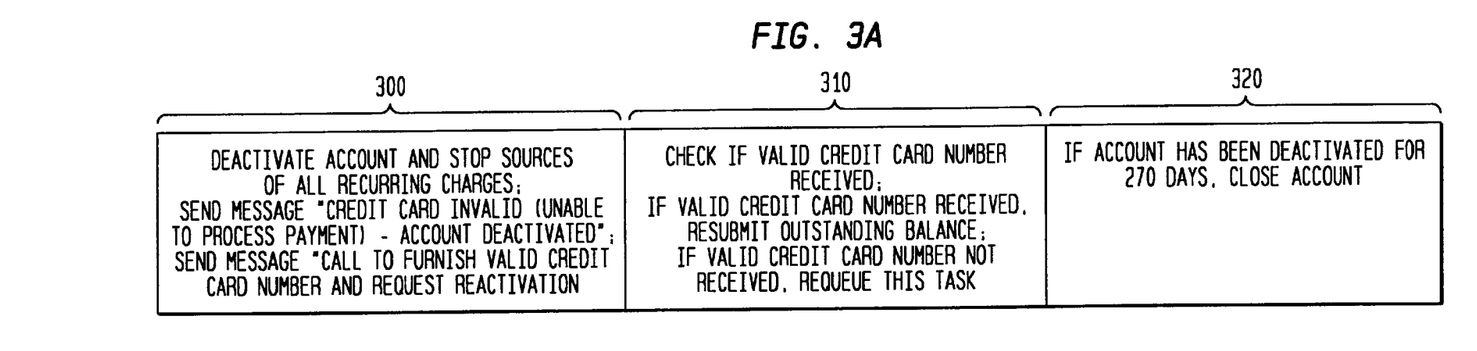
FIGS. 3A and 3B show a format of tasks created from job steps and task dividers, according to an embodiment of the present invention.
Figure 3B:
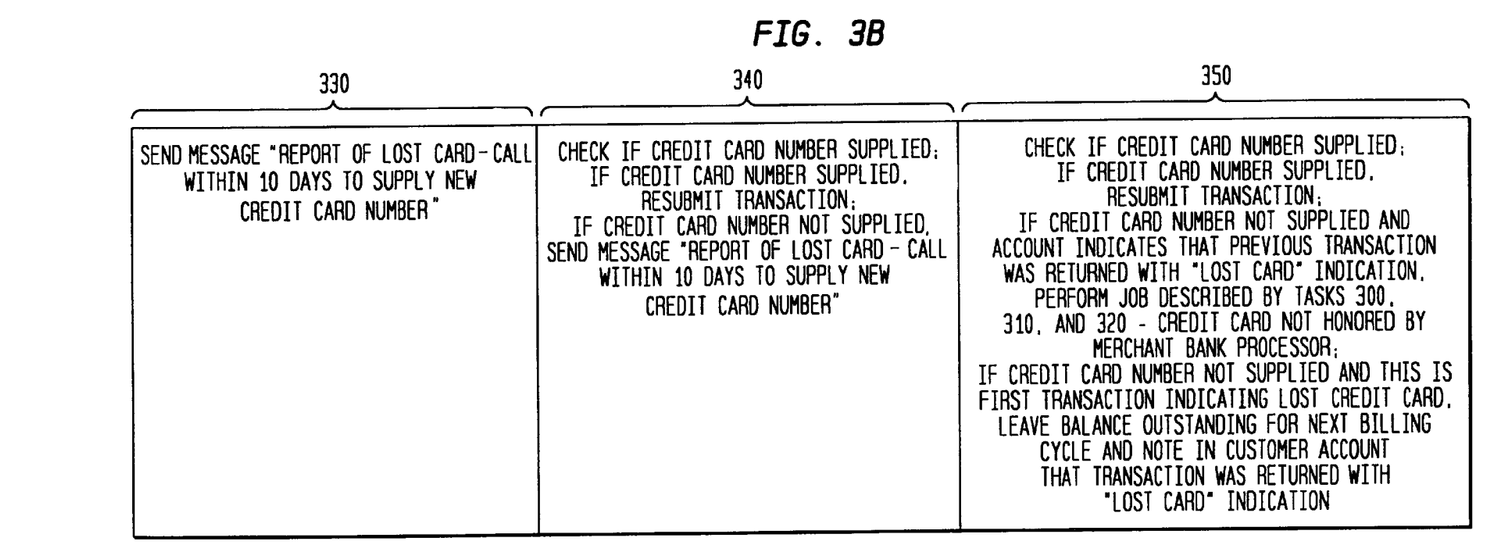

FIGS. 3A and 3B show a format of tasks created from job steps and task dividers, according to an embodiment of the present invention. FIG. 3A shows the format of tasks created from the job steps and task dividers associated with the sample job shown in Table 1. Note that task 310 can invoke (or requeue) itself depending on the condition when it is completed. FIG. 3B shows the format of tasks created from the job steps and task dividers associated with the sample job shown in Table 2. The examples shown in FIGS. 3A and 3B are for illustrative purposes; any number of tasks can be created for any number of job steps and task dividers.

Figure 4A:
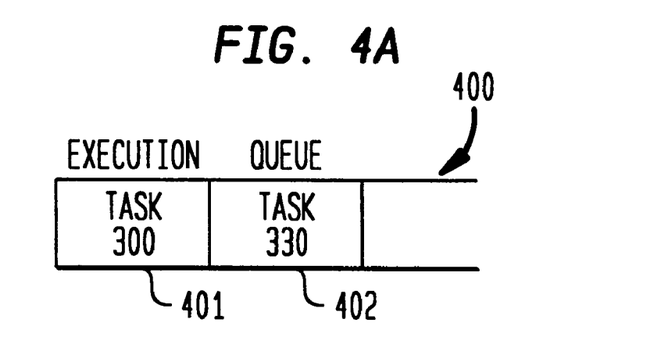
FIGS. 4A and 4B show formats of the execution queue and the alert table, according to an embodiment of the present invention.
Figure 4B:
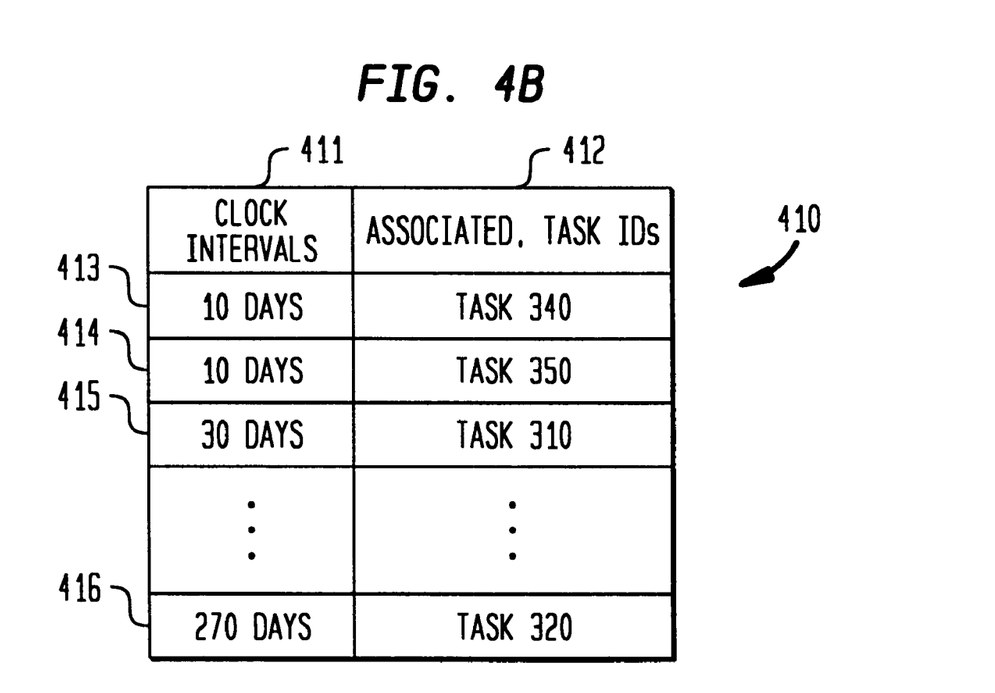

FIGS. 4A and 4B show formats of the execution queue and the alert table, according to an embodiment of the present invention. FIG. 4A shows execution queue 400 containing tasks that can be executed immediately by a human operator or, in some cases, autonomously. FIG. 4B shows alert table 410 containing clock intervals 411 and associated task identifications 412.

In FIG. 3A, task 300 is created from job steps 1, 2 and 3 associated with the job shown in Table 1. Because task 300 can be executed immediately using data already available, task 300 can be entered into execution queue 400 for immediate execution at entry 401. Task 300 will wait for execution until a human operator is available.

Task 310 is created from job step 4 associated with the job shown in Table 1. Task 310 can be executed, for example, every 30 days for up to 270 days or until a valid credit card number is received. As shown in FIG. 4B, task 310 is entered into alert table 410 at entry 415. Consequently, when 30 days elapse, task 310 is executed and can result in task 310 being entered again into alert table 410. When task 300 is completed, it causes entries 415 and 416 to be made in the alert table. When entry 416 is executed, the account will be closed if it has been deactivated, for example, for 270 days. The date of deactivation can be state information stored in the account.

Task 320 is created from job step 5 associated with the job shown in Table 1. Task 320 is entered into alert table 410 at entry 416. When 270 days has elapsed, task 320 will be entered into execution queue 400 where it will be executed autonomously or when a human operator becomes available.

In FIG. 3B, task 330 is created from job step 1 associated with the job shown in Table 2. Because task 330 can be executed immediately and need not wait for new data, task 330 can be entered into execution queue 400 for immediate execution at entry 402. Task 330 will wait for execution behind task 300 at entry 401; once task 300 at entry 401 has been executed, task 330 at entry 402 will be executed either autonomously or when a human operator becomes available.

Task 340 is created from job steps 2, 3 and 4 associated with the job shown in Table 2. Because task 340 should be executed within, for example, 10 days, task 340 can be entered into alert table 410 at entry 413. When 10 days has elapsed, task 340 at entry 413 will be entered into execution queue 400 where it will wait for execution until a human operator is available.

Task 350 is created from job steps 5, 6, 7 and 8 associated with the job shown in Table 2. Task 350 is entered into alert table 410 at entry 414 by task 340. When an additional 10 days elapse, task 350 will be entered into execution queue 400 where it will wait for execution when a human operator becomes available.

Note that task 350 includes a conditional statement that can trigger the job associated with Table 1. If the job associated with Table 1 is triggered, then task 300 will again be entered into the end of execution queue 400 and tasks 310 and 320 will again be entered into alert table 410 with appropriate clock intervals.

Returning to FIG. 2, steps 240 through 270 are performed separately for each job step within each task. In other words, once steps 240 through 270 are performed for the first job step for a given task, steps 240 and 270 are repeated for the each subsequent job step for that task until all job steps for all tasks are processed.

At conditional step 240, a systems engineer determines whether the current job step is similar to any job steps that comprise the previously created tasks. Alternatively, conditional step 240 can be performed autonomously (e.g., a computer programmed with appropriate software). If the current job step is not similar to previously defined job steps, then the process ends. If the current job step is similar to previously defined job steps, then the process proceeds to step 260.

For example, a system engineer can compare the current job step to all previously defined job steps and can determine whether the similarity between the current job step and any other job step exceeds a predefined subjective threshold. For example, where job steps are largely similar, then the job steps can likely be refined to be identical (i.e., a standard job step).

At step 250, the current job step can be made to conform with a standard job step so that the standard job step can be reused. At step 260, task dividers may be repositioned to create the conformance described with respect to step 250. Step 270 permits further adjustment in the definition of a job step so that its execution will be efficient.

A specific example showing the operation of steps 240 through 270 can be illustrated using FIGS. 3A and 3B. At conditional step 240, after task 340 has been created, the first job step of task 340, "check if credit card number supplied," is compared to the job steps of tasks 300, 310, 320 and 330. This job step is similar to the first job step of task 310, "check if valid credit card received."At step 250, the first job step of task 310 and 340 are identified as a standard job step.

At step 260, the process proceeds to step 270 without changing tasks 310 or 340 because the first job steps of tasks 310 and 340 can be defined as such without having to reposition the task dividers defining tasks 310 or 340.

At step 270, the first job steps of tasks 310 and 340 are adjusted to increase efficiency. Because both job steps perform the same function but are unnecessarily implemented in different ways, the job steps can be changed to implement the job steps identically or consistently. Implementing the job steps consistently and designing them such that automation can be applied more effectively increases the cost effectiveness and efficiency of the job steps.

By partitioning jobs into stateless tasks, each task can be performed by a different human operator in a planned and predictable time. The same human operator need not perform every task associated with a job; consequently, tasks can be performed by different human operators in a quicker and more efficient manner.

Furthermore, by defining the stateless tasks and/or the associated job steps to be reusable when possible, for example, through recursion, the execution of tasks can be performed more economically and more efficiently. Additionally, similar types of tasks can be assigned to the same human operator; the same human operator performing the same type of tasks can likely become more efficient at executing that type of task.

It should, of course, be understood that while the present invention has been described in reference to a particular system configuration and process, other system configurations and processes should be apparent to those of ordinary skill in the art. For example, the present invention can operate with any number of communication devices, service provider platforms, service provisioning systems, billing platforms and payment system platforms, and be connected to a communication network or combination of communication networks.

What is claimed is:

1. A method for partitioning each job from a plurality of jobs into stateless tasks, the method being performed by a computer, comprising:
   (a) marking each job with at least one task divider, each task divider indicating where required data is unavailable, defining each job as a plurality of job steps against a time line;
   (b) for each task divider, performing the following substeps:
      (i) preserving state information;
      (ii) creating a task which tests for availability of the required data; and
      (iii) entering the task into an alert table or an execution queue based on availability of required data relating to said task; and
   (c) recursively redefining a first job step from the plurality of job steps when the first job step is similar to a second job step from the plurality of job steps.

2. The method of claim 1, wherein the alert table includes an identification for each task entered into the alert table and a time interval indicating when each task in the alert table is to be transferred to the execution queue.

3. The method of claim 2, further comprising:
   (d) entering into the execution queue the task entered into the alert table at step (b)(iii) when the time interval has elapsed.

4. The method of claim 1, wherein said step (c) includes the substeps of:
   (i) determining that the first job step is similar to the second job step;
   (ii) when necessary, repositioning task dividers for the job associated with the first job step and the job associated with the second job step; and
   (iii) when necessary, adjusting the first job step and the second job step to increase opportunity for automation and efficient execution.

5. The method of claim 1, wherein each job is a customer care activity associated with a response to a rejected transaction returned by a payment system that processes a charge transaction against a credit or debit account.

6. An apparatus for partitioning each job within a plurality of jobs into stateless tasks, comprising:
   an adjunct platform having a processor, a computer-readable memory, a network port connected to a communications system and a data bus connecting the processor, the computer-readable memory and the network port, the processor including an execution queue, the computer-readable memory storing an alert table;
   said adjunct platform marking each job with at least one task divider, each task divider indicating where required data is unavailable,
   for each task divider, preserving state information, creating a task which tests for availability of the required data, and entering the task into the alert table or the execution queue;
   said adjunct platform defining each job as a plurality of job steps against a time line; and
   said adjunct platform recursively redefining a first job step associated with the plurality of job steps when the first job step is similar to the second job step associated with the plurality of job steps.

7. The apparatus of claim 6, wherein the alert table includes an identification of each task entered into the alert table and a time interval indicating when each task in the alert table is to be transferred to the execution queue.

8. The apparatus of claim 7, wherein said adjunct platform enters into the execution queue the task entered into the alert table.

9. The apparatus of claim 6, wherein:
   said adjunct platform determines that the first job step is similar to the second job step;
   said adjunct platform, when necessary, repositions task dividers for the job associated with the first job step and the job associated with the second job step; and
   said adjunct platform, when necessary, adjusts the first job step and the second job step to increase opportunity for automation and efficient execution.

10. The apparatus of claim 6, wherein said adjunct platform has a processor, a computer readable memory, a data port to be connected to a payment system, a network port to be connected to the communications network, and a data bus connecting the processor, the computer readable memory, the data port and the network port.

11. The apparatus of claim 6, wherein:
said adjunct platform is a billing platform; and each job is a customer care activity associated with a response to a rejected transaction returned by a payment system that processes a charge transaction against a credit or debit account.

12. An apparatus for partitioning each job within a plurality of jobs into stateless tasks, comprising:
means for marking each job with at least one task divider, each task divider indicating where required data is unavailable;
means for preserving state information for each task divider;
means for creating a task, for each task divider, which tests for availability of the required data;
means for entering the task into an alert table or an execution queue, for each task divider;
means for defining each job as a plurality of job steps against a time line; and
means for recursively redefining a first job step associated with the plurality of job steps when the first job step is similar to the second job step associated with the plurality of job steps.

13. An article of manufacture, comprising:
a computer-readable medium having stored thereon instructions for partitioning each job from a plurality of jobs into stateless tasks, said instructions which, when executed by a processor having an execution queue and being connected to an alert table, cause the processor to:
(a) mark each job with at least one task divider, each task divider indicating where required data is unavailable and define each job as a plurality of job steps against a time line;
(b) for each task divider:
(i) preserve state information;
(ii) create a task which tests for availability of the required data; and
(iii) enter the task into the alert table or the execution queue; and
(c) recursively redefine a first job step from the plurality of job steps when the first job step is similar to a second job step from the plurality of job steps.

\* \* \* \* \*